March 11, 1952
R. J. IFIELD
2,588,530
APPARATUS FOR SUPPLYING LIQUID FUEL TO THE
COMBUSTION CHAMBER OF, AND CONTROLLING THE
QUANTITY OF MOTIVE AIR IN HOT-AIR ENGINES
Filed Jan. 7, 1949
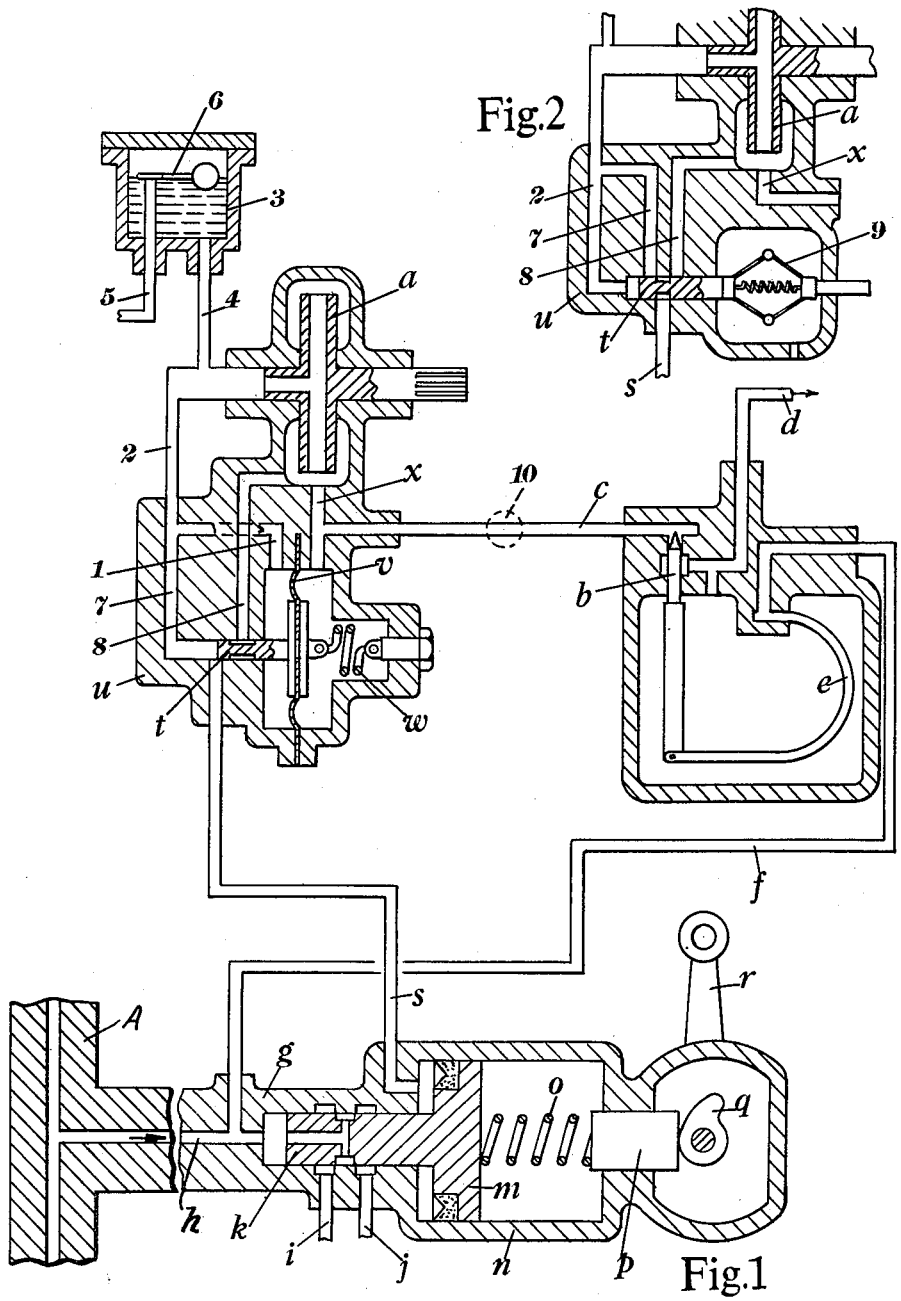
Inventor
R. J. Ifield Patented Mar. 11, 1952

2,588,530

UNITED STATES PATENT OFFICE 2,588,530

APPARATUS FOR SUPPLYING LIQUID FUEL TO THE COMBUSTION CHAMBER OF, AND CONTROLLING THE QUANTITY OF MOTIVE AIR IN, HOT-AIR ENGINES

Richard Joseph Ifield, Dural, New South Wales, Australia, assignor to Joseph Lucas Limited, Birmingham, England Application January 7, 1949, Serial No. 69,722
In Great Britain January 10, 1948

7 Claims. (Cl. 60—24)

This invention has for its object to provide improved means for supplying liquid fuel to the combustion chamber of, and controlling the quantity of motive air in, a hot-air engine, that is to say, an engine in which hot air flows in a closed system.

The invention comprises the combination of a centrifugal fuel pump, means responsive to pressure of the motive air in the engine for controlling the flow of fuel from the pump to the combustion chamber of the engine, means responsive to the pressure of liquid fuel from the pump for varying the quantity of motive air in the engine, a valve for controlling the second mentioned means, and means responsive to a condition associated with the engine for actuating the valve.

In the accompanying drawing, Figure 1 is a diagrammatic view illustrating one embodiment of the invention for use with a hot air engine in which the mass of motive air in the engine can be varied and in which the heat required is obtained by combustion of a liquid fuel in an external combustion chamber. Figure 2 is a diagram illustrating a modified detail.

Referring to Figure 1, A indicates a part of the closed air system of a hot air engine, and $a$ represents a centrifugal pump adapted to be driven by the engine. For the control of the quantity of fuel supplied by the pump to the combustion chamber of the engine, a throttle valve $b$ is provided, this serving to control the rate of flow of fuel from the pump along a pipe $c$ to a pipe $d$ leading to the combustion chamber. The valve $b$ is responsive to the pressure of the motive air in the engine, and in the arrangement shown is connected to the free end of a Bourdon tube $e$. The interior of this tube is connected by a pipe $f$ to a valve body part $g$, the latter being in communication with the motive air system of the engine at $h$.

For varying the amount of motive air in the engine, the said body part $g$ is provided at $i$ with a connection to a compressed air reservoir, and at $j$ with an outlet to atmosphere. Within the body part $g$ is arranged a slidable piston valve $k$ adapted to control communication between the passages $h, i, j$. At one end this valve is formed with or secured to a piston $m$ slidable in a cylinder $n$ and loaded by a spring $o$. The pressure exerted by the spring $c$ on the piston $m$ is variable by a slidable abutment $p$ which is adjustable by a cam $q$ under the action of a manually operable lever $r$. The end of the cylinder $n$ remote from that containing the spring $o$ is connected by a pipe $s$ to a valve $t$ associated with the pump.

The valve $t$ in the example shown is of the piston type and is slidable in a bore in the body part $u$. At one end the valve $t$ is attached to a diaphragm $v$ which is loaded by a spring $w$. The diaphragm divides a chambered portion of the body part into two compartments one of which is in communication by way of a passage $x$ with the delivery side of the pump and the pipe $c$. The other compartment is in communication with the inlet side of the pump by way of a passage 1 and pipe 2.

Liquid fuel is supplied to the pump at a constant head from a reservoir 3 through a pipe 4. The reservoir is supplied from any convenient source through a pipe 5, the inflow to the reservoir being controlled by a float-valve 6.

The valve $t$ controls the communication between the pipe $s$, and passages 7, 8 respectively leading to the inlet and outlet sides of the pump.

The mode of action is as follows: Assuming that the engine is operating at a certain predetermined speed and that due to a reduction of the load on the engine, or other condition, this speed is exceeded, the effect of the excess speed is to increase correspondingly the pressure of the liquid fuel at the delivery side of the pump $a$. This causes the valve $t$ to move to the left and establish communication between the passage 8 and the pipe $s$. The increased pressure consequently exerted on the piston $m$ will move the latter to the right, thus establishing communication between the connection with the motive air system at $h$ and the atmosphere at $j$. The air pressure in the pipe $f$ will consequently fall and the throttle valve $b$ will move in the direction for restricting the fuel supply to the combustion chamber along the pipe $d$, thereby correcting the engine speed. With resumption of normal speed the control mechanism will return to its previous condition.

For increasing the amount of motive air in the system, the valve $k$ is moved to the left under the action of the parts $r, q, p, o,$ thereby enabling air to flow from the compressed air reservoir through the passage $i$ and valve $k$ to the passage $h$ connected to the system. A similar effect is obtained automatically in the event of a fall in the normal speed of the engine. In this case the drop of pressure on the right hand side of the diaphragm $v$ will allow the spring $w$ to move the valve $t$ to the right, and establish communication between the pipe $s$ and the passage 7. The resulting drop of pressure acting on the left hand side of the piston m will allow the spring o to move the valve k to the left for establishing communication between i and h.

Instead of arranging for the valve t to be responsive to a difference of fluid pressure acting on a diaphragm as above described, I may employ a centrifugal device for actuating this valve as illustrated at Figure 2. In this case, a centrifugal governor as 9 driven by the engine is employed for imparting the desired movements to the valve t in response to variations of engine speed.

If desired the system may be adapted to be responsive to any other factor associated with the engine, either instead of or in addition to the speed factor above described. Thus, if it is desired to control the fuel supply in response to the temperature in the combustion chamber, any convenient valve under the control of a temperature responsive means may be arranged between the fuel pump and the piston-actuated valve. Where it is required to effect control by both the speed of the engine and the temperature in the combustion chamber a throttle valve actuated by a temperature responsive means may be located at any convenient position, such as for example at 10 (Figure 1).

The invention is not, however, restricted to the constructional details above described, as these may be varied to suit different requirements. Thus for example instead of the diaphragm v an equivalent piston may be used, and I desire it to be understood that the term diaphragm as employed in the foregoing description is to be understood as including a slidable piston.

Having thus described my invention what I claim as new and desire to secure by Letters Patent is:

1. Apparatus for supplying liquid fuel to the combustion chamber of, and controlling the quantity of motive air in, a hot-air engine, and comprising the combination of a centrifugal fuel pump, means responsive to pressure of the motive air in the engine for controlling the flow of fuel from the pump to the combustion chamber of the engine, means responsive to the pressure of the liquid fuel for varying the quantity of motive air in the engine, a valve for controlling the second mentioned means, and means responsive to a force dependent on motion of the engine for actuating the valve.

2. Apparatus as claimed in claim 1, in which the means for controlling the flow of fuel from the pump to the combustion chamber, comprises the combination of a throttle valve, and a Bourdon tube adapted to actuate the throttle valve by pressure of the motive air.

3. Apparatus as claimed in claim 1, in which the means for varying the quantity of motive air in the engine, comprises the combination of inlet and outlet passages for the motive air, a piston valve adapted to control the passages, an actuating piston associated with the piston valve, a cylinder containing the piston, a spring, and manually operable means acting through the spring on the piston.

4. Apparatus as claimed in claim 1, in which the means for actuating the valve comprises a member responsive to the speed of the engine.

5. Apparatus as claimed in claim 1, in which the means for actuating the valve comprises a member responsive to the pressure of fuel delivered by the pump.

6. Apparatus as claimed in claim 1, in which the means for actuating the valve comprises a diaphragm connected to the valve, a chamber divided by the diaphragm into two compartments, a passage through which liquid fuel from the pump has access to one of the compartments, and a spring acting on the diaphragm.

7. Apparatus as claimed in claim 1, in which the means for actuating the valve comprises a centrifugal governor connected to the valve and operable by the engine.

RICHARD JOSEPH IFIELD.

REFERENCES CITED

The following references are of record in the file of this patent:

UNITED STATES PATENTS

| Number | Name | Date |
| --- | --- | --- |
| 2,428,830 | Birmann | Oct. 14, 1947 |
| 2,447,267 | Mock | Apr. 17, 1948 |